US008831603B2

(12) United States Patent
Nicol et al.

(10) Patent No.: US 8,831,603 B2
(45) Date of Patent: Sep. 9, 2014

(54) COMMUNICATIONS CIRCUIT AND METHOD WITH REDUCED POWER CONSUMPTION

(75) Inventors: Christopher John Nicol, New South Wales (AU); Oliver Ridler, New South Wales (AU); Charles Nicholas Alexander Thomas, Pennant Hills (AU)

(73) Assignee: Agere Systems LLC, Allentown, PA (US)

( * ) Notice: Subject to any disclaimer, the term of this patent is extended or adjusted under 35 U.S.C. 154(b) by 1190 days.

(21) Appl. No.: 11/480,296

(22) Filed: Jun. 30, 2006

(65) Prior Publication Data

US 2008/0004008 A1    Jan. 3, 2008

(51) Int. Cl.
| | | |
|---|---|---|
| H04B 7/00 | (2006.01) | |
| H04B 7/204 | (2006.01) | |
| H04W 4/00 | (2009.01) | |
| H04W 52/02 | (2009.01) | |
| H04W 52/14 | (2009.01) | |

(52) U.S. Cl.
CPC .......... *H04W 52/0229* (2013.01); *H04W 52/02* (2013.01); *H04W 52/146* (2013.01); *Y02B 60/50* (2013.01)
USPC ............ 455/434; 455/522; 370/318; 370/329

(58) Field of Classification Search
CPC .............. H04W 52/02; H04W 52/146; H04W 72/0413; H04W 24/02
USPC ................... 455/434, 572–574, 343.1–343.5; 370/215, 329, 331; 713/200, 300
See application file for complete search history.

(56) References Cited

U.S. PATENT DOCUMENTS

| | | | | |
|---|---|---|---|---|
| 5,621,345 | A | * | 4/1997 | Lee et al. ...................... 327/254 |
| 6,072,987 | A | * | 6/2000 | Willey ......................... 340/7.43 |
| 2004/0044945 | A1 | * | 3/2004 | Park et al. ..................... 714/776 |
| 2005/0250452 | A1 | * | 11/2005 | Walton et al. ................ 455/63.4 |

FOREIGN PATENT DOCUMENTS

| | | |
|---|---|---|
| WO | WO 02/27958 | 4/2002 |
| WO | WO 03/069826 | 8/2003 |
| WO | WO 03/096580 | 11/2003 |

OTHER PUBLICATIONS

Hooli, K. "Equalization in WCDMA Terminals," Department of Electrical and Information Engineering, University of Oulu, Finland (2003).
Tellez et al., Activity-Driven Clock Design for Low Power Circuits,: Computer-Aided Design, ICCAD-95, Digest of Technical Papers, IEEE/ACM International Conference, pp. 62-65 (Nov. 5-9, 1995).

(Continued)

*Primary Examiner* — Nizar Sivji
(74) *Attorney, Agent, or Firm* — Ryan, Mason & Lewis, LLP (57) ABSTRACT

A method of operating a communications circuit with at least one control channel and at least one data channel includes the steps of monitoring the at least one control channel, powering a receiver portion of the circuit when the at least one control channel indicates that data is to be received, and refraining from powering the receiver portion when the at least one control channel indicates that data is not to be received. The circuit can operate, for example, under the 3GPP HSDPA standard. Where desired, the clock and power supply to the receiver portion and a bit rate processing portion can be independently gated.

13 Claims, 4 Drawing Sheets

(56) References Cited

OTHER PUBLICATIONS

Mutoh et al., "1-V Power Supply High-Speed Digital Circuit Technology with Multithreshold-Voltage CMOS," IEEE Journal of Solid-State Circuits, vol. 30, pp. 847-854 (Aug. 1995).

Anonymous, "Universal Mobile Telecommunications System (UMTS); Terminal Conformance Specification, Radio Transmission and Reception (FDD), 3GPP TS 34.121 V6.0.0," pp. 1-20, 492-495 (Mar. 2005).

Anonymous, "3$^{rd}$ Generation Partnership Project; Technical Specification Group Radio Access Network; Spreading and modulation (FDD), 3GPP TS 25.213, V5.5.0" (Dec. 2003).

Anonymous, "3$^{rd}$ Generation Partnership Project; Technical Specification Group Radio Access Network; Physical channels and mapping of transport channels onto physical channels (FDD), 3GPP TS 25.211, V5.6.0" (Sep. 2004).

* cited by examiner

COMMUNICATIONS CIRCUIT AND METHOD WITH REDUCED POWER CONSUMPTION

FIELD OF THE INVENTION

The present invention relates generally to communications circuits, and more particularly relates to techniques for reducing power consumption in such circuits.

BACKGROUND OF THE INVENTION

Reducing power consumption in wireless equipment is of high importance. This is especially true for the complex equipment required to receive high data rate channels, such as, for example, third generation partnership project high speed downlink packet access (3GPP HSDPA) channels. There are several known techniques for reducing power consumption in integrated circuits. These include clock gating and power supply disconnection.

Well-known techniques of clock gating are discussed, for example, in the paper by Tellez et al. entitled "Activity-Driven Clock Design for Low Power Circuits" as published in the ICCAD-95 Digest of Technical Papers at pages 62-65. Activity-driven clock trees reduce the dynamic power consumption of synchronous digital complementary metal oxide semiconductor (CMOS) circuits. Sections of an activity-driven clock tree can be turned on/off by gating the clock signals during the active/idle times of the clock elements. The goal is to minimize the dynamic power consumption of a system.

Well-known techniques of power supply disconnection are described, for example, in the paper of Mutoh et al. entitled "1-V Power Supply High-Speed Digital Circuit Technology with Multithreshold-Voltage CMOS" as presented in the IEEE Journal of Solid-State Circuits, volume 30, at pages 847-854 in August 1995. Multithreshold-voltage CMOS circuit technology is described therein, exhibiting one-volt supply voltage, high-speed, low-power, large scale integration (LSI) operation. Metal oxide semiconductor field effect transistors (MOSFETs) with two different threshold voltages are employed on a single chip, and a sleep control scheme is utilized for efficient power management.

While the generic power reduction techniques of clock gating and power supply disconnection (power supply gating) are effective, prior art techniques do not adequately address the question of when such gating should occur.

Accordingly, it would be desirable to overcome the disadvantages associated with prior art techniques.

SUMMARY OF THE INVENTION

An exemplary method of operating a communications circuit with at least one control channel and at least one data channel, according to one aspect of the invention, includes the steps of monitoring the at least one control channel, powering a receiver portion of the circuit when the at least one control channel indicates that data is to be received, and refraining from powering the receiver portion when the at least one control channel indicates that data is not to be received. The circuit can operate, for example, under the 3GPP HSDPA standard. The at least one control channel, can be, for example, a high speed shared control channel (HS-SCCH) and the data channel (or channels) can be, for example, one or more high speed physical downlink shared channels (HS-PDSCH).

In another aspect, an exemplary embodiment of a communications circuit for operation with at least one control channel and at least one data channel can include a control channel receiver module configured to monitor the at least one control channel, and a data channel receiver module that is coupled to the control channel receiver module and configured to be powered-on when the at least one control channel indicates that data is to be received and further configured to be powered-down when the at least one control channel indicates that data is not to be received.

If desired, the exemplary circuit can be implemented as an integrated circuit. Further, in yet another aspect, the circuit can form part of a higher assembly in the form of a communications apparatus, by being coupled to a radio frequency front end that is configured to receive signals carrying the at least one control channel and the at least one data channel, and to output in-phase and quadrature (IQ) samples from the front end. The samples can then be supplied to the control channel receiver module and the data channel receiver module.

A more complete understanding of the present invention, as well as further features and advantages of the present invention, will be obtained by reference to the following detailed description and drawings.

DETAILED DESCRIPTION

Figure 1:
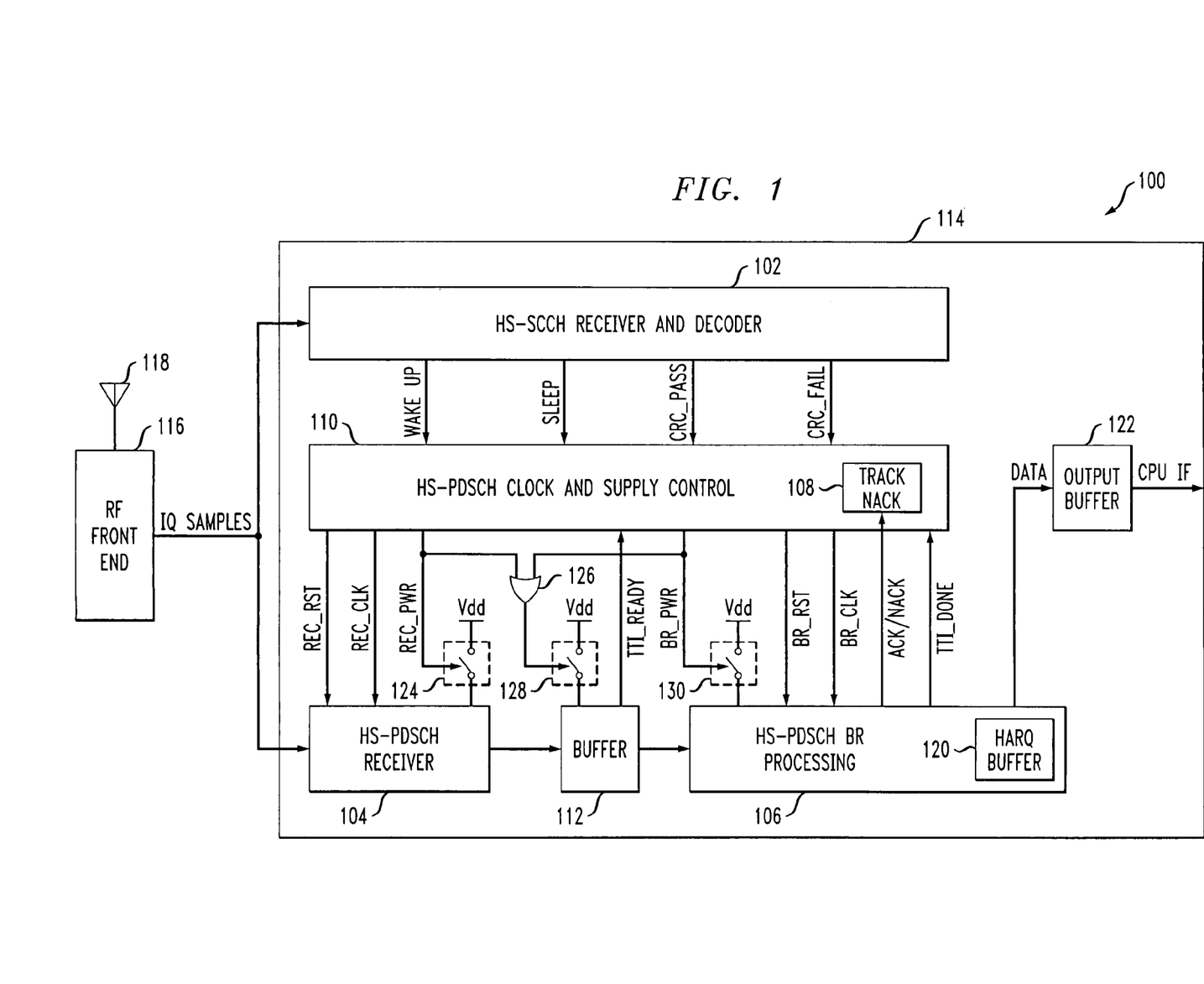
FIG. 1 is a block diagram depicting an exemplary embodiment of a communications circuit in accordance with one aspect of the invention.

FIG. 1 shows a block diagram 100 of an exemplary embodiment of a communications circuit for operation with at least one control channel and at least one data channel, according to an aspect of the invention. Circuit 100 includes a control channel receiver module, for example, an HS-SCCH receiver and decoder 102. Block 102 is configured to monitor the at least one control channel. Circuit 100 also includes a data channel receiver module, such as HS-PDSCH receiver 104 that is coupled to the control channel receiver module 102 and configured to be powered-on when the at least one control channel indicates that data is to be received, and to be powered-down when the at least one control channel indicates that data is not to be received. Circuit 100 can be configured for operation under, for example, the 3GPP HSDPA standard. The at least one control channel can be an HS-SCCH control channel, and the at least one data channel can be an HS-PDSCH channel. Multiple control channels and multiple data channels can be employed; by way of example and not limitation, in HSDPA there can be up to four HS-SCCH control channels and up to 15 HS-PDSCH data channels.

Circuit 100 can also include a bit rate processing block 106 that is configured to be powered down when the at least one control channel indicates that no bit rate processing is required and no retransmission is pending (in the case of multiple control channels, all of such channels would have to indicate that no data was expected). The Bit Rate Processing block carries out the Physical Channel and Transport Channel processing functions on the received HS-PDSCH channels. Further, circuit 100 can include a tracking portion, for example, the Track NACK block 108 that is coupled to the bit rate processing (BRP) block 106. Block 108 can be configured to determine that no retransmission is pending. In an exemplary embodiment, the track NACK block can determine that retransmission is pending without help from the control channels, based on the ACK/NACK info from the bit rate processing block. Track NACK need not determine when BRP is needed, only when the contents of the HARQ buffer must be kept (and thus power to BRP is required). Bit rate processing block 106 can also be configured to be powered and clock-gated when the at least one control channel indicates that no bit rate processing is required and a retransmission is pending.

In the exemplary embodiment depicted in FIG. 1, the Track NACK block 108 is part of a larger data channel clock and supply control module, for example, the indicated HS-PDSCH clock and supply control module 110.

Circuit 100 can also include a buffer 112 interposed between the data channel receiver module 104 and the bit rate processing block 106. In one or more embodiments, power to the buffer 112 can be maintained substantially continuously during operation of the circuit. In one or more other embodiments, power to the buffer 112 can be maintained when the receiver portion 104 and/or the bit rate processing block 106 are powered, and power to the buffer 112 can be cut when neither the receiver module 104 nor the bit rate processing block 106 is powered.

The aforementioned data channel clock and supply control module 110 can be coupled to the control channel receiver module 102, the data channel receiver module 104, the bit rate processing block 106, and the buffer 112. Data channel receiver module 104 can include a data receiver clock REC_CLK. Module 110 can be configured to receive appropriate control signals from the control channel receiver module 102, and to control one or more of power to the data channel receiver module 104, power to the bit rate processing block 106, power to the buffer 112, clock-gating of the bit rate processing block 106, and clock-gating of the data receiver block 104.

Circuit 100 can, if desired, be formed as an integrated circuit 114. Circuit 114 can be coupled to a radio frequency (RF) front end 116 that is configured to receive signals, via antenna (or antennae) 118, that carry the at least one control channel and the at least one data channel. Front end 116 can output appropriate in-phase and quadrature (IQ) samples to the control channel receiver module 102 and the data channel receiver module 104. While any desired level of integration can be employed, in one or more embodiments, RF front end 116 and antenna 118 can be implemented separately from integrated circuit 114. RF front end 116 and circuit 114 can together form a communications apparatus, essentially the next higher assembly for circuit 114.

Additional illustrative and exemplary details of circuit 100 will now be discussed. Bit rate processing module 106 can include a hybrid automatic repeat-request (HARQ) buffer 120. HARQ buffers are well-known to the skilled artisan in the communications field. Further, circuit 100 can include an output buffer 122 coupled to the bit rate processing module 106. The skilled artisan will appreciate that the buffers referred to herein, including the claims, such as buffers 112, 120, 122, are typically electronic memories, such as random access memories (RAMs).

As shown in FIG. 1, one or more techniques of the exemplary embodiment of the invention depicted therein can employ information from the HS-SCCH control channel to determine when to gate the clock and power supply to the data channel receiver module 104 and the bit rate processing module 106 independently. Since blocks 104, 106 typically need to operate at different times, the separate control can potentially yield substantial power savings. As alluded to previously, certain types of wireless transmissions, for example, HSDPA transmissions, employ control channels, such as the aforementioned HS-SCCHs that carry information regarding future data transmissions, and data channels, such as the aforementioned HS-PDSCHs, that carry the user data. The control channels must typically be constantly monitored because they indicate when a data transmission needs to be received in the next HS-PDSCH transmission time interval (TTI), or other comparable time interval if another transmission standard is employed. The circuits that receive and decode the HS-PDSCHs or other data channels can advantageously be de-activated for the relatively large periods of time when data is not being received, which can potentially result in a large power savings. Packet data carried on HS-PDSCHs or similar channels may be bursty in nature, wherein periods of data reception are interspersed with periods of idleness. During such periods of idleness, the data circuits, such as the HS-PDSCH layer one circuits can advantageously be disabled to reduce power.

As noted, there are known techniques for reducing power through mechanisms of clock gating and disconnection, or gating, of the power supply. Clock gating eliminates dynamic power dissipation, but leakage power is still consumed. Power supply disconnection or gating both eliminates dynamic power dissipation and reduces leakage power dissipation. However, the power supply typically cannot be disconnected when logic circuits need to operate or when buffers such as RAMs must retain their contents.

The layer one circuits of a wireless receiver may be divided into two blocks, the receiver block 104 and the bit rate processing block 106. Power dissipation, using techniques of the invention, may advantageously be reduced (ideally, optimized) by controlling the clock and power supply to blocks 104, 106 independently, inasmuch as they typically may need to operate at different times.

The various signals in the exemplary embodiment of FIG. 1 will now be discussed. Block 102 typically receives the control channel IQ samples from RF front end 116 and produces the WAKE UP, SLEEP, CRC_PASS, and CRC_FAIL signals, which can be sent to the block 110. These signals, respectively, determine whether a WAKE UP or SLEEP is to be initiated, and whether the cyclic redundancy check (CRC) has passed or failed. Block 110 can generate appropriate receiver reset, receiver clock, and receiver power signals REC_RST, REC_CLK, and REC_PWR respectively. Similar reset, clock and power signals can be generated for the bit rate processing module 106, namely, BR_RST, BR_CLK, and BR_PWR. Ready and done signals for the transmit time interval can be supplied to block 110 by blocks 112, 106 respectively, and are designated, respectively, as TTI_READY and TTI_DONE. A signal indicating acknowledgement, or lack of same, can be supplied to Track NACK block 108 from block 106, and is designated as the ACK/NACK signal. Block 106 supplies data to output buffer 122, which in turn outputs Central Processing Unit interface (CPU IF) signals as shown.

Still referring to FIG. 1, the power supply to block 104 can be disabled using the REC_PWR signal so as to reduce power consumption. The signal can be used to control a switch 124 between the $V_{dd}$ power supply and block 104. Power supply to block 104 can be enabled when the block 102 detects that data will need to be received in the following TTI (block 102 would send the WAKE UP signal in such case). The power-up initialization of the receiver circuits in block 104 can occur during the slot preceding the HS-PDSCH data (further details will be provided below with regard to FIG. 4; see in particular the "Initialize Receiver" row shown therein). Block 104 can remain powered and active until the control channel indicates that no more data will be arriving. This can be indicated, for example, by an HS-SCCH part two CRC failure, or via the HS-SCCH part one, which would result in the SLEEP signal from block 102.

Power supply to bit rate processing block 106 can be disabled when no bit rate processing is required and when no transmissions are pending (HARQ buffer is empty). In the event that no bit rate processing is required, but a retransmission is pending, the bit rate power supply must typically be maintained, but the bit rate clock can be inhibited (gated). The condition when no bit rate processing is required but a retransmission is pending can correspond to an unacknowledged NACK being sent for a HARQ process, indicating that valid data exists in the HARQ buffer. Power supply to the bit rate processing block 106 can be removed (if the Track NACK block indicates no retransmissions are pending) after the HS-SCCH CRC fails and the existing bit rate processing is completed, corresponding to the TTI_DONE signal in FIG. 1.

Buffer 112 between blocks 104 and 106 typically does not need to retain its contents when neither block is powered-up. Thus, the power enable signal for buffer 112 can be produced by logically ORing the REC_PWR and BR_PWR signals, using OR gate 126. The configuration and logic shown in FIG. 1 are exemplary, and other approaches are possible. For example, in some embodiments, buffer 112 can remain powered at all times. Further exemplary details will be provided in connection with FIG. 3 below. The output of OR gate 126 can be used to control a switch 128 for power supply to buffer 112. The BR_PWR signal can be used to control a switch 130 for power supply to block 106. In each case, an appropriate power supply level $V_{dd}$ is present.

The block 110 can keep track of the ACK/NACK state of each active HARQ process, via Track NACK block 108. This information, along with the WAKE UP, SLEEP, CRC_PASS, CRC_FAIL, TTI_READY, and TTI_DONE signals can allow block 110 to generate the receiver clock, reset and power signals REC_CLK, REC_RST and REC_PWR and the bit rate clock, reset and power signals BR_CLK, BR_RST and BR_PWR. Each reset signal can be pulsed after the corresponding supply power is enabled, so that the logic wakes up in a known state. The delay between application of power and the reset pulse should typically be as small as possible, yet large enough to ensure that the power supply to the logic circuit has stabilized.

The HS-PDSCH receiver power supply and clock control logic is:
REC_PWR and REC_CLK=ON when WAKEUP=1.
REC_PWR and REC_CLK=OFF when SLEEP=1 or CRC_FAIL=1.
REC_RST is pulsed after each rising edge of REC_PWR.
The BR power supply and clock control logic is:
BR_PWR and BR_CLK=ON when TTI_READY=1.
BR_PWR=OFF when TTI_DONE=1 and CRC_FAIL=1 and no outstanding NACKs.
BR_CLK=OFF when TTI_DONE=1 and CRC_FAIL=1.
BR_RST is pulsed after each rising edge of BR_PWR.

The HS-SCCH part 1 indicator may typically be less reliable than the part 2 CRC. Thus, in some cases, part 1 may falsely indicate that data is coming in the next HS-PDSCH TTI. As a result, the receiver will start to receive garbage. This case will typically result in an HS-SCCH part 2 CRC failure, and the bit rate block need never be activated at all in response to this situation. Further details are shown below with regard to TTI 5 in FIG. 4 (false WAKE UP).

Figure 2:
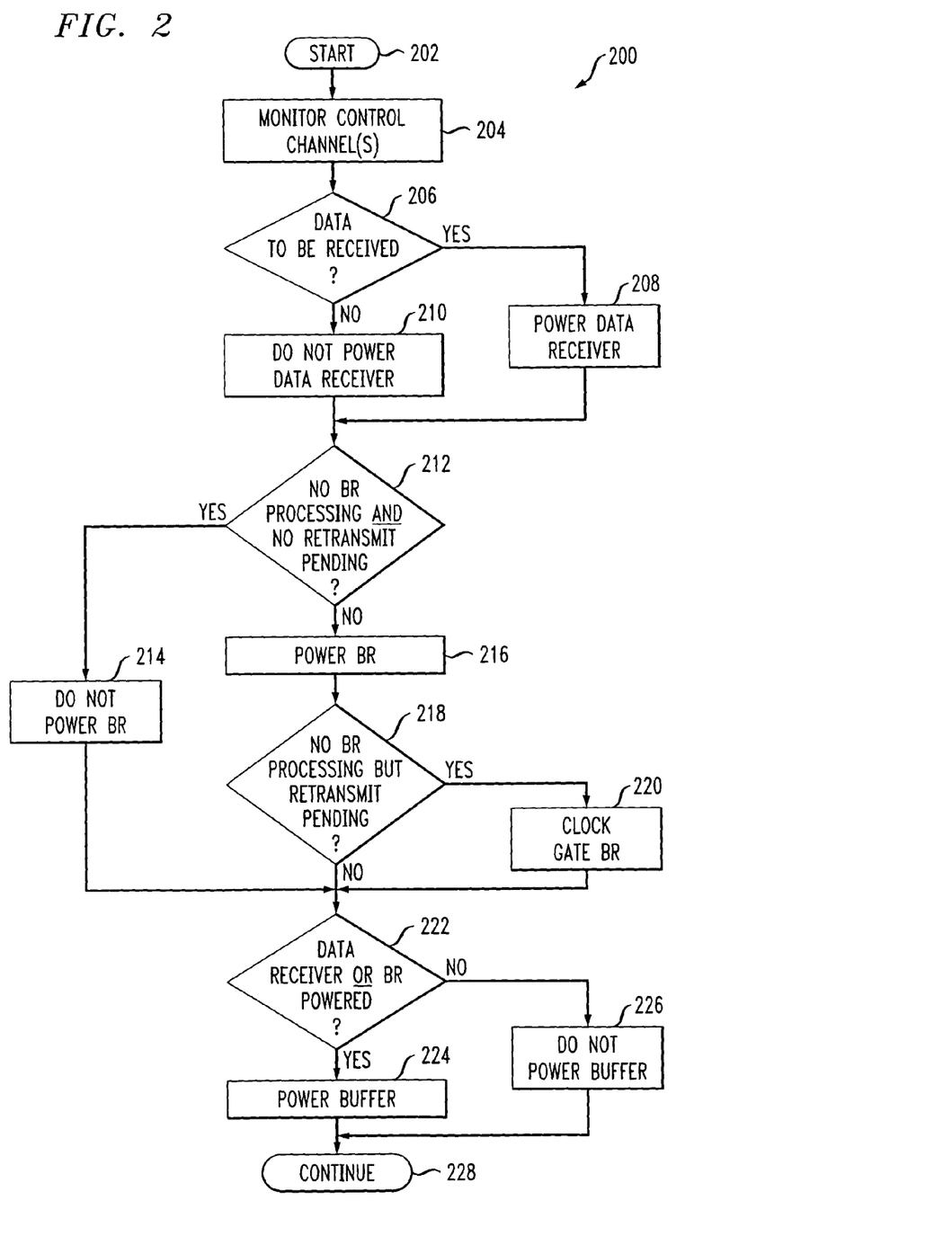
FIG. 2 is a flowchart showing method steps in an exemplary method of operating a communications circuit with at least one control channel and at least one data channel, according to another aspect of the invention.

FIG. 2 shows a flowchart 200 of exemplary method steps in a method of operating a communications circuit according to an aspect of the invention. The method can be computer-implemented, in the sense that the circuitry discussed with regard to FIGS. 1 and 3 can be employed to carry out the method steps. The circuit can be of the kind described herein, and can have at least one control channel and at least one data channel, as discussed above. After beginning at block 202, the method can include the step of monitoring the at least one control channel, as at block 204. Further, the method can include the step of powering a receiver portion of the circuit, such as a data channel receiver module as discussed above, at block 208, when the at least one control channel indicates that data is to be received (this can be determined at decision block 206). Further, the method can include the step of refraining from powering the receiver portion when the at least one control channel indicates that data is not to be received, as shown in block 210, and corresponding to the "no" branch of decision block 206.

Optionally, one can refrain from powering a bit rate processing block of the circuit, as shown at block 214, when the at least one control channel indicates that no bit rate processing is required and no retransmission is pending, as determined, for example, at decision block 212. If the "no" branch of block 212 is indicated, power can be maintained to the bit rate processing block, as at block 216. Furthermore, if no bit rate processing is required and a retransmission is pending, as determined at decision block 218, then the bit rate processing block can be clock-gated, as shown at block 220. It will be appreciated that the decision blocks can make use of, e.g., information on the control channel or channels, information from the Track NACK block, and the like.

Still further, in some embodiments of the invention, a buffer such as buffer 112 can be substantially continuously powered whenever the circuit is operated. Alternatively, logic as shown at blocks 222-226 can be followed. In such a case, power can be maintained to the buffer, as shown at block 224, when either the data receiver or the bit rate processing blocks are to be powered, as determined at decision block 222. Conversely, when neither is to be powered, as at the "no" branch of block 222, the buffer can be powered down, as at block 226. The process continues at block 228.

Figure 3:
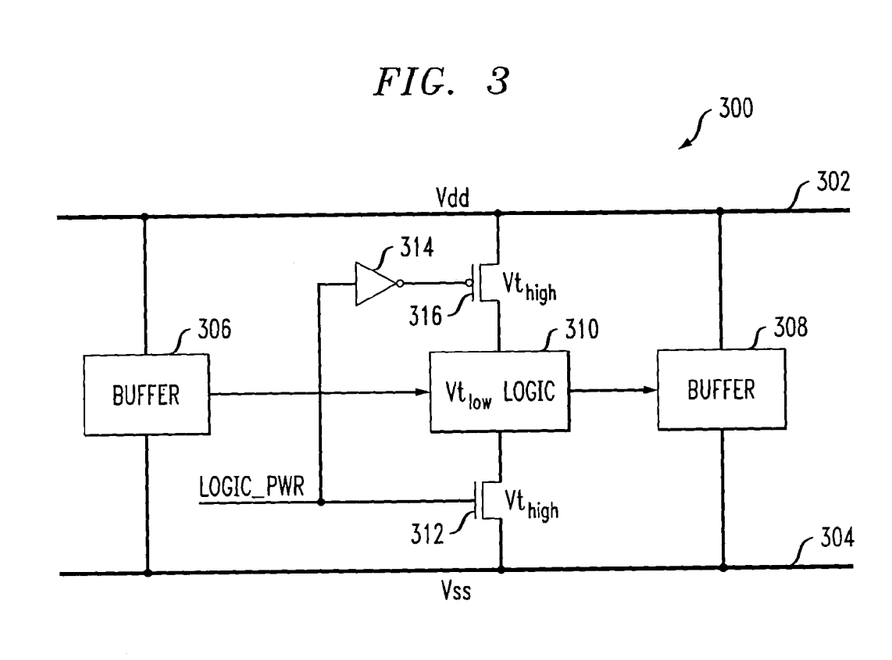
FIG. 3 depicts a block diagram of a useful technique for disconnecting logic power supply, while buffers remain enabled, according to another aspect of the invention.

Attention should now be given to FIG. 3, which generally depicts one manner in which a logic power supply can be disconnected while buffers remain enabled. FIG. 3 shows a circuit 300 having high and low voltage power supply rails $V_{dd}$ and $V_{ss}$, also numbered as 302 and 304, respectively. Buffers 306 and 308 can be powered substantially continuously as shown in FIG. 3. While FIG. 3 does not necessarily represent any particular part of FIG. 1, for example, buffer 308 could correspond to the HARQ buffer within module 106 or to the output buffer 122. A logic block 310 can correspond, for example, to the bit rate processing block 106 in FIG. 1. A Logic_PWR signal can be provided. Such signal can correspond, for example, to the BR_PWR signal in FIG. 1. The signal can be applied directly to the gate of n-type FET (NFET) 312, and can be inverted in inverter 314 and applied to the gate of p-type FET (PFET) 316. Thus, when the signal is high, FETs 312, 316 will be turned on, causing block 310 to be connected between the two power supplies 302, 304. When the Logic_PWR signal is low, these FETs 312, 316 will be non-conducting, and no power will be supplied to logic block 310. It will be appreciated that in FIG. 3, and elsewhere in the figures described herein, alternative polarities and different logic schemes can be used to achieve equivalent results. $Vt_{high}$ and $Vt_{low}$ are two different threshold voltages typically available in the transistors in a CMOS integrated circuit. The high threshold transistors are slower and have lower leakage, while the low threshold transistors are faster with higher leakage.

Figure 4:
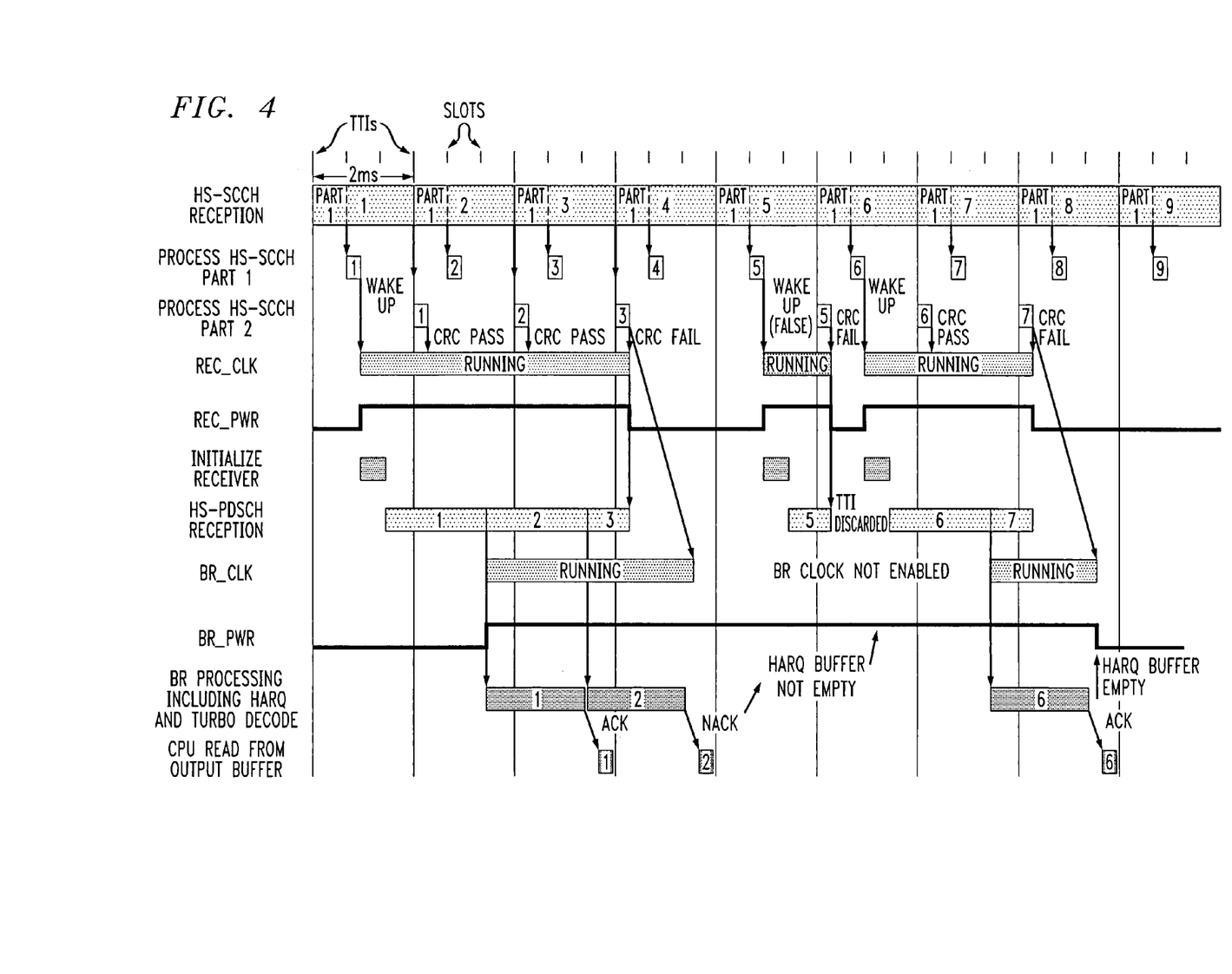
FIG. 4 is an exemplary system timing diagram for operation of a system in accordance with yet another aspect of the invention.

FIG. 4 shows an exemplary timing diagram for operation of circuit 100. Nine TTIs are depicted, each having 3 slots. The total duration of each TTI is 2 ms. The first row shows reception of the control channel. The second and third rows show processing of parts 1 and 2 of the control channel, respectively. The fourth row shows the state of the REC_CLK clock signal for receiver module 104, while the fifth row shows the condition of the REC_PWR power signal for receiver portion 104. Initialization of the receiver portion 104 is shown in row 6, while the reception on the data channel is shown in row 7. Rows 8 and 9 show the clock and power signals for the bit rate processing block 106. Row 10 shows the bit rate processing, including the HARQ and the Turbo decode. Turbo coding is the channel coding specified by 3GPP. See Third Generation Partnership Project (3GPP) Technical Specification TS25.212 V5.10.0. Finally, the last row shows the CPU Read from the output buffer 122.

It will be appreciated that some communications systems may carry the control and data channels in the same physical channel, in which case it may still be possible to realize some of the power savings described. For example, the control channel could be included in one of several data channels, so in this example, the particular physical channel (control channel) must be received all the time, but the other data channels can be received by a separate receiver than is controlled as described herein. As used herein, including the claims, where the context so indicates, a "control channel" is intended to encompass the arrangement described in this paragraph.

EXAMPLE

Estimates of the power saved with this invention in a heavy web browsing scenario are calculated here for purely exemplary purposes, to facilitate application of one or more inventive techniques by the skilled artisan. These calculations are not to be taken as limiting, and greater or lesser power savings may be achieved, depending on the given circumstances and application; further, different scale technologies can be employed.

Assumptions:
average data downloaded per minute is 500 kbytes,
with throughput bursts of 1 Mbps,
in bursts of 3 back-to-back TTIs,
BLER (block error rate) of 10%,
10 users requesting data at any one time,
130 nm process with $Vt_{low}$ (low threshold voltage) transistor leakage of 3 nA, $Vt_{high}$ (high threshold voltage) transistor leakage of 0.1 nA, and
35% of power dissipation is due to leakage power, 65% due to dynamic power.

$$\text{Time} = \frac{DATAPERMIN}{THROUGHPUT} \left( \frac{1}{\left( \frac{1}{BLER} - 1 \right)} + 1 \right) = 4.5 \text{ sec} \quad (1)$$

The HS-PDSCH receiver will, in this example, be powered for an extra 2 slots for every burst of packet reception, because a slot is required for training time and it will, in this example, always be active for an unnecessary slot at the end of the burst. Using the assumption that each burst is 3 TTIs (9 slots), the HS-PDSCH receiver is active for 11/9×4.5 seconds=5.5 seconds in every 60. So, for 81% of the time the receiver has no dynamic power and the leakage power is reduced by a factor of 30.

$$\text{Power\_Saving} = 1 - \left( \text{Active }\% + (\text{ClockGate }\% \times 0.35) + \left( \text{PowerDown }\% \times \frac{0.35}{30} \right) \right) \quad (2)$$

The exemplary power saving in the HS-PDSCH receiver=1−(0.09+0+(0.81×0.35/30))=90%, in this particular case, presented for illustrative purposes.

The bit rate processing clocks are typically only active while data is being received (4.5 seconds in every 60 seconds in this example), but the power supply must be maintained while HARQ retransmissions are pending. The extra time that power is required simply to power the HARQ RAM can be estimated as follows:

$$\text{Time} = \text{BLER} \times \text{users} \times 4.5 \text{ sec} = 4.5 \text{ sec} \quad (3)$$

Thus, the BRP is powered and active for 4.5 seconds in every 60 (7.5%), the clock is gated for about 4.5 seconds in every 60 (7.5%), and power is disconnected for the remaining 85% of the time. The exemplary power saving in the BRP=1−(0.075+(0.075×0.35)+(0.85×0.35/30))=89%, for this particular exemplary case.

At least a portion of the techniques of the present invention described herein may be implemented in an integrated circuit. In forming integrated circuits, a plurality of identical die are typically fabricated in a repeated pattern on a surface on a semiconductor wafer. Each die can include an entire circuit or elements as described herein, and can include other structures or circuits. The individual die are cut or diced from the wafer and then packaged as an integrated circuit. One skilled in the art will know how to dice wafers and package die to produce integrated circuits. Integrated circuits so manufactured are considered part of this invention. Further, from the descriptions of the circuits provided herein, the skilled artisan will be able to develop appropriate mask sets for fabricating integrated circuits according to one or more embodiments of the present invention.

Although illustrative embodiments of the present invention have been described herein, it is to be understood that the invention is not limited to those precise embodiments, and that various other changes and modifications may be made by one skilled in the art without departing from the scope of the invention as set forth in the appended claims.

We claim:
1. A method of operating a communications circuit with at least one control channel and at least one data channel, comprising the steps of:
monitoring said at least one control channel;
powering a receiver portion of said communications circuit when said at least one control channel indicates data is to be received;
refraining from powering said receiver portion when said at least one control channel indicates that data is not to be received;
independently of said powering and refraining from powering of said receiver portion, refraining from powering a bit rate processing block of said circuit when no bit rate processing is required and no retransmission is pending; and independently of said powering and refraining from powering of said receiver portion, powering said bit rate processing block of said circuit when:
bit rate processing is required; and/or
a retransmission is pending; and
powering said bit rate processing block of said circuit and clock-gating said bit rate processing block of said circuit, such that said bit rate processing block is powered but a clock for said bit rate processing block is not enabled when:
no bit rate processing is required; and
a retransmission is pending; wherein:
said receiver portion is powered at least a portion of time when said bit rate processing block is not powered; and
said receiver portion is not powered at least a portion of time when said bit rate processing block is powered.

2. The method of claim 1, wherein said circuit is configured for operation under a 3GPP HSDPA standard, said at least one control channel comprises an HS-SCCH control channel, and said at least one data channel comprises an HS-PDSCH channel.

3. The method of claim 1, further comprising the additional step of maintaining power to a buffer interposed between said receiver portion and said bit rate processing block substantially continuously during said operating of said circuit.

4. The method of claim 1, further comprising the additional steps of:
maintaining power to a buffer interposed between said receiver portion and said bit rate processing block when at least one of said receiver portion and said bit rate processing block is powered; and
refraining from powering said buffer interposed between said receiver portion and said bit rate processing block when neither said receiver portion nor said bit rate processing block is powered.

5. A communications circuit for operation with at least one control channel and at least one data channel, comprising:
a control channel receiver module configured to monitor said at least one control channel;
a data channel receiver module coupled to said control channel receiver module, said data channel receiver module being configured to be powered-on when said at least one control channel indicates data is to be received and being configured to be powered-down when said at least one control channel indicates that data is not to be received;
a bit rate processing block coupled to said data channel receiver module, wherein:
said bit rate processing block is configured to be powered down, independently of said powering-on and powering-down of said data channel receiver module, when:
no bit rate processing is required; and
no retransmission is pending;
said bit rate processing block is configured to be powered independently of said powering-on and powering-down of said data channel receiver module, when:
bit rate processing is required; and/or
a retransmission is pending; and
wherein said bit rate processing block of said circuit is configured to be powered and clock-gated, such that said bit rate processing block is powered but a clock for said bitrate processing block is not enabled when:
no bit rate processing is required; and
a retransmission is pending;

a tracking portion, wherein said tracking portion is coupled to said bit rate processing block and is configured to determine whether said retransmission is pending; wherein:
said receiver portion is powered at least a portion of time when said bit rate processing block is not powered; and
said receiver portion is not powered at least a portion of time when said bit rate processing block is powered.

6. The circuit of claim 5, wherein said circuit is configured for operation under a 3GPP HSDPA standard, said at least one control channel comprises an HS-SCCH control channel, and said at least one data channel comprises an HS-PDSCH channel.

7. The circuit of claim 5, further comprising a buffer interposed between said data channel receiver module and said bit rate processing block, wherein power to said buffer is maintained substantially continuously during operation of said circuit.

8. The circuit of claim 5, further comprising a buffer interposed between said data channel receiver module and said bit rate processing block, wherein power to said buffer is maintained when at least one of said data channel receiver module and said bit rate processing block is powered and power to said buffer is cut when neither said data channel receiver module nor said bit rate processing block is powered.

9. The circuit of claim 8, further comprising a data channel clock and supply control module coupled to said control channel receiver module, said data channel receiver module, said bit rate processing block, and said buffer, said tracking portion being contained within said data channel clock and supply control module, said data channel clock and supply control module being configured to receive control signals from said control channel receiver module and to control:
power to said data channel receiver module;
power to said bit rate processing block;
power to said buffer; and
clock-gating of said bit rate processing block.

10. The circuit of claim 9, wherein said data channel receiver module comprises a data receiver clock, and wherein said data channel clock and supply control module is further configured to control clock-gating of said data receiver clock.

11. The circuit of claim 5, wherein said circuit is formed as an integrated circuit.

12. A communications apparatus for operation with at least one control channel and at least one data channel, comprising:
a radio frequency (RF) front end configured to receive signals carrying said at least one control channel and said at least one data channel and to output in-phase and quadrature (IQ) samples therefrom;
a control channel receiver module coupled to said RF front end and configured to receive said IQ samples therefrom for monitoring said at least one control channel;
a data channel receiver module coupled to said control channel receiver module and coupled to said RF front end so as to receive said IQ samples therefrom, said data channel receiver module being configured to be powered-on when said at least one control channel indicates data is to be received and being configured to be powered- down when said at least one control channel indicates that data is not to be received;
a bit rate processing block coupled to said data channel receiver module, wherein:
said bit rate processing block is configured to be powered down, independently of said powering-on and powering-down of said data channel receiver module, when:
no bit rate processing is required; and
no retransmission is pending;

said bit rate processing block is configured to be powered independently of said powering-on and powering-down of said data channel receiver module, when:
  bit rate processing is required; and/or
  a retransmission is pending; and
wherein said bit rate processing block of said circuit is configured to be powered and clock-gated, such that said bit rate processing block is powered but a clock for said bit rate processing block is not enabled when:
  no bit rate processing is required; and
  a retransmission is pending;
a tracking portion, wherein said tracking portion is coupled to said bit rate processing block and is configured to determine whether said retransmission is pending; wherein:
said receiver portion is powered at least a portion of time when said bit rate processing block is not powered; and
said receiver portion is not powered at least a portion of time when said bit rate processing block is powered.

13. The apparatus of claim 12, wherein said apparatus is configured for operation under a 3GPP HSDPA standard, said at least one control channel comprises an HS-SCCH control channel, and said at least one data channel comprises an HS-PDSCH channel.

* * * * *